F. J. MACHALSKE.
ELECTRIC FURNACE.
APPLICATION FILED JUNE 27, 1913.
1,099,559.
Patented June 9, 1914.
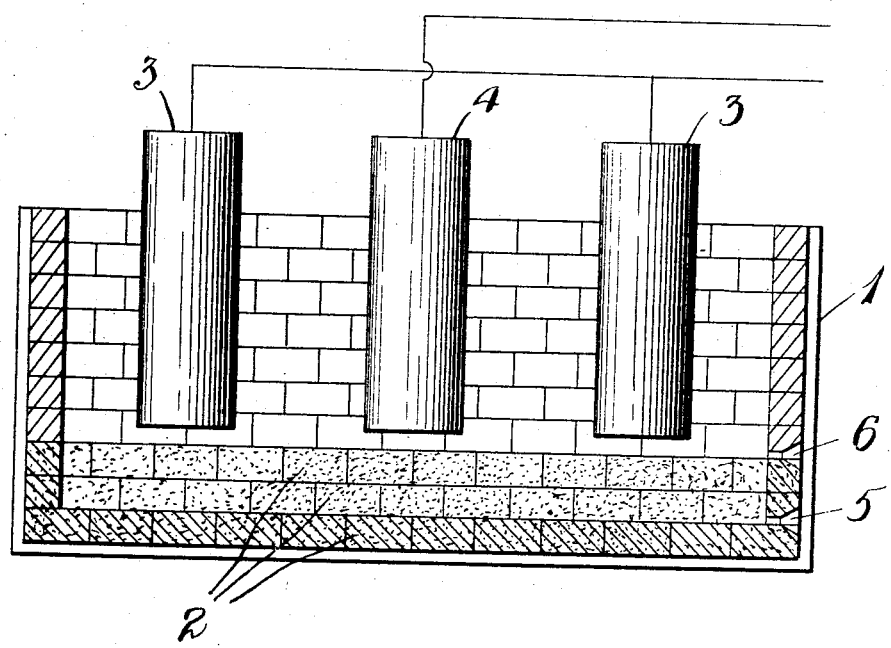
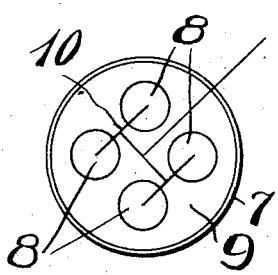
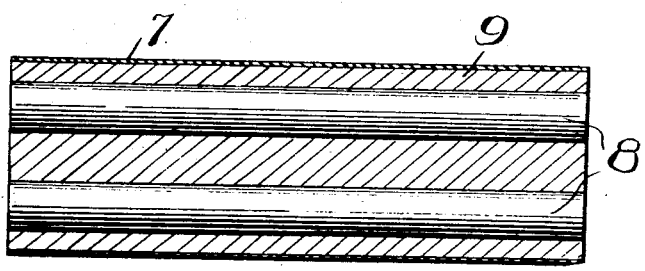
Witnesses:
Inventor
F. J. Machalske
By his Attorneys form the filler (magnesium oxid or dolo-
UNITED STATES PATENT OFFICE.

FLORENTINE J. MACHALSKE, OF PLATTSBURG, NEW YORK, ASSIGNOR, BY MESNE ASSIGNMENTS, TO AMERICAN FERROLECTRIDE CORPORATION, OF PLATTSBURG, NEW YORK, A CORPORATION OF NEW YORK.

ELECTRIC FURNACE.

1,099,559.      Specification of Letters Patent.      Patented June 9, 1914.

Application filed June 27, 1913. Serial No. 776,158.

*To all whom it may concern:*

Be it known that I, FLORENTINE J. MACHALSKE, a citizen of the United States, residing at Plattsburg, Clinton county, New York, have invented certain new and useful Improvements in Electric Furnaces, of which the following is a full, clear, and exact description.

My invention relates to electric furnaces and has for its object to provide an electric furnace for smelting ores, more particularly iron ores, having a permanent lining which is practically unaffected by the molten metal and does not combine therewith so as to produce impurities therein.

In electrically smelting ores, especially where the furnace charges are of basic character, an ordinary carbon lining will not resist the action of the molten metal or the slag and a lining of other refractory materials like magnesite brick, while partly resisting the action of the slag, will not resist the action of molten iron. Linings such as either of those above mentioned which are now commonly used, are destroyed very rapidly, and, moreover, where an ordinary carbon lining is used, the carbon enters into combination with the molten metal, thereby affecting its properties and reducing its value.

I have discovered that if the lining of a smelting furnace, where it comes in contact with the molten iron, is made of electrically produced graphite and at other points is made of a suitable refractory material, the above mentioned objections and difficulties are overcome, so that the life of the lining is of long duration and the iron is not affected by the combination of the lining with the molten metal.

The following is a description of an embodiment of my invention, reference being had to the accompanying drawings, in which—

Figure 1 represents a cross section of a furnace of the open type, Fig. 2 is a plan view of one of the electrodes, and Fig. 3 is a longitudinal section of the same.

Referring more particularly to the drawings. 1 is the casing of the furnace having at its bottom a layer of bricks of artificial graphitic carbon or graphite, namely, electrically treated carbon known as Acheson graphite. The subjecting of ordinary carbon to the heat of an electric arc converts it into such artificial graphite and produces a substantially pure graphite product greatly superior to native graphite for my purposes. The lower portion of the walls of the furnace is composed of bricks of the artificial graphite. In the drawings the two layers of brick 2 are of this artificial graphite brick. In the furnace I use, the graphite brick upon the walls extends upward a distance of about six inches from the bottom. Above the graphite brick, the walls are composed of magnesite (magnesium carbonate) brick, this being a highly refractory material which is practically unaffected by the slag.

3—3—4 are electrodes which are inserted in the charge, being located near the bottom of the furnace at the start, and after the charge has become somewhat heated, raised so as to be slightly above the upper surface of the molten metal and surrounded at their lower ends by the slag. The electrodes 3—3 are connected to one terminal of a source of current, while the electrode 4 is connected to the other terminal of said source. The furnace is provided with a tap hole 5 at the bottom for drawing off the molten metal and a tap hole 6 located just above the graphite portion of the walls for drawing off the slag.

In connection with this furnace I prefer to use a special form of electrode, although other forms may be used. This form of electrode is shown in detail in Figs. 2 and 3. and consists of a metal sheath or casing 7 of any desired diameter, preferably of sheet iron, the diameter which I have used being about twenty inches. Within this metal sheath or casing, and extending the full length thereof, are four carbon rods 8, which, for the sake of cheapness, may be of ordinary carbon, although they may also be of graphite. The space within the casing surrounding the four carbon rods is filled with a filling 9 of closely packed magnesium oxid or "dolomite" (calcium-magnesium carbonate—MgCaC$_2$O$_6$). I mix the filler (magnesium oxid or dolomite) with some binding material, such as tar or silicate of soda, the binder, when tar is used, being heated during the mixing process. I use only enough of the binder to form the filler (magnesium oxid or dolomite) into a cohering mass. After the filler mixture is packed into the casing around the carbon rods, the electrode is thoroughly baked to drive off any remaining moisture. The carbon rods when the electrode is in use are electrically connected together as at 10 and to the source of current. With such an electrode when it is used in a furnace, the lower ends of the carbon rods first become highly heated by the passage of the current and then communicate the heat to the lower portions of the magnesium oxid surrounding the same, which then becomes a conductor of relatively low conductivity, with the result that the electrode has when in use a very extended incandescent area at its lower portion, which condition is the desired condition in a smelting furnace. The magnesium oxid (dolomite) being a slag forming element, adds to the slag formed in the furnace and protects the molten metal from the carbon. The lower ends of the carbon rods, however, are quickly converted into graphitic carbon or artificial graphite so that even if they come in contact with the molten metal, they are not attacked thereby nor is the metal combined therewith so as to be carburized. The particular composition and construction of the electrode above referred to, while disclosed herein, is not claimed herein, being the subject matter of another application filed simultaneously herewith Serial No. 776157.

In operating the furnace, the tap 6 is ordinarily left open so as to drain off the slag. The tap 5 is opened from time to time so as to drain off the molten metal, the molten metal being maintained at a height corresponding to the height of the graphite portion of the walls of the furnace during substantially the period of operation of the furnace. When the furnace is tapped to draw off the molten metal, more of the charge is shoveled in so as to quickly make up for the metal drawn off. The charge used in operating this furnace should be a basic charge as distinguished from an acid charge, and is preferably of the character described in another application filed simultaneously herewith Serial No. 776,156, viz., a charge in which artificial graphite is used as the reducing or de-oxidizing agent.

What I claim is:

1. A furnace having its bottom and the lower portions of its side walls lined with artificial graphitic carbon and having the adjacent portions of its walls covered with magnesite.

2. A furnace having its bottom and the lower portions of its side walls lined with artificial graphitic carbon and having the adjacent portions of its walls covered with a magnesite lining and having taps located adjacent to the bottom of the furnace and at the top of the graphitic lining.

FLORENTINE J. MACHALSKE.

Witnesses:
W. H. CLARK,
T. G. HOYT.

Copies of this patent may be obtained for five cents each, by addressing the "Commissioner of Patents, Washington, D. C."